(12) United States Patent
Muthuswamy et al.

(10) Patent No.: US 11,850,670 B2
(45) Date of Patent: Dec. 26, 2023

(54) MILLING CUTTING INSERTS

(71) Applicant: KENNAMETAL INDIA LIMITED, Bangalore (IN)

(72) Inventors: Padmakumar Muthuswamy, Bangalore (IN); Bharath Arumugam, Bangalore (IN)

(73) Assignee: KENNAMETAL INDIA LTD., Bangalore (IN)

(*) Notice: Subject to any disclaimer, the term of this patent is extended or adjusted under 35 U.S.C. 154(b) by 0 days.

(21) Appl. No.: 17/236,408

(22) Filed: Apr. 21, 2021

(65) Prior Publication Data
US 2021/0331258 A1 Oct. 28, 2021

(30) Foreign Application Priority Data
Apr. 24, 2020 (IN) .............................. 202041017679

(51) Int. Cl.
*B23C 5/06* (2006.01)
*B23C 5/20* (2006.01)

(52) U.S. Cl.
CPC ........ *B23C 5/202* (2013.01); *B23C 2200/208* (2013.01)

(58) Field of Classification Search
CPC .. B23C 5/06; B23C 5/20; B23C 5/207; B23C 5/202; B23C 2200/043; B23C 2200/361; B23C 2200/367; B23C 2200/41; B23C 2200/0494; B23C 2200/203; B23C 2200/208
See application file for complete search history.

(56) References Cited

U.S. PATENT DOCUMENTS

| | | | |
|---|---|---|---|
| 4,699,549 A | 10/1987 | Shimomura et al. | |
| 5,028,175 A | 7/1991 | Pawlik | |
| 5,158,402 A | 10/1992 | Satran et al. | |
| 5,382,118 A | 1/1995 | Satran et al. | |
| 5,695,303 A | 12/1997 | Boianjiu et al. | |
| 5,971,672 A | 10/1999 | Hansson | |
| 6,238,146 B1 * | 5/2001 | Satran | B23C 5/08 407/115 |
| 6,599,061 B1 | 7/2003 | Nelson | |
| 6,872,034 B2 | 3/2005 | Satran et al. | |
| 7,993,082 B2 | 8/2011 | Horiike et al. | |
| 8,931,979 B2 * | 1/2015 | Choi | B23C 5/202 407/115 |
| 9,272,342 B2 | 3/2016 | Ishi | |
| 9,724,770 B2 | 8/2017 | Cheon | |
| 9,808,871 B2 * | 11/2017 | Choi | B23C 5/2226 |
| 9,937,566 B2 | 4/2018 | Chang | |

(Continued)

FOREIGN PATENT DOCUMENTS

| | | | | |
|---|---|---|---|---|
| CA | 2779195 A1 * | 5/2011 | ........... | B23B 27/141 |
| EP | 2106870 A1 * | 10/2009 | ............... | B23C 5/06 |
| WO | WO-2017047700 A1 * | 3/2017 | ............... | B23C 5/10 |

*Primary Examiner* — Nicole N Ramos
(74) *Attorney, Agent, or Firm* — Christopher J. Owens

(57) ABSTRACT

Cutting tool systems including a cutting tool holder and cutting inserts are disclosed. The cutting inserts have eight cutting edges and eight wiper edges. The first and second faces each include at least two cutting edges or two wiper edges on alternating sides of the cutting insert. The cutting edges and wiper edges are structured and arranged to allow the cutting insert to be interchangeably used in both right handed and left handed cutting tool holders.

20 Claims, 8 Drawing Sheets

(56) References Cited

U.S. PATENT DOCUMENTS

| | | | |
|---|---|---|---|
| 10,112,242 B1 | 10/2018 | Hecht | |
| 10,207,341 B2 | 2/2019 | Chang | |
| 10,799,961 B2 * | 10/2020 | Kitajima | B23C 5/109 |
| 11,167,361 B2 * | 11/2021 | Morisaki | B23C 5/20 |
| 2004/0022590 A1 | 2/2004 | Satran et al. | |
| 2009/0136304 A1 * | 5/2009 | Satran | B23C 5/202 |
| | | | 407/104 |
| 2010/0003089 A1 | 1/2010 | Horiike et al. | |
| 2011/0164932 A1 * | 7/2011 | Choi | B23C 5/06 |
| | | | 407/42 |
| 2014/0298967 A1 | 10/2014 | Ishi | |
| 2014/0341660 A1 | 11/2014 | Cheon | |
| 2016/0175945 A1 | 6/2016 | Chang | |
| 2016/0175947 A1 | 6/2016 | Chang | |
| 2018/0257155 A1 * | 9/2018 | Kitajima | B23C 5/2472 |
| 2018/0304382 A1 | 10/2018 | Hecht | |
| 2018/0333791 A1 * | 11/2018 | Lee | B23C 5/202 |

* cited by examiner

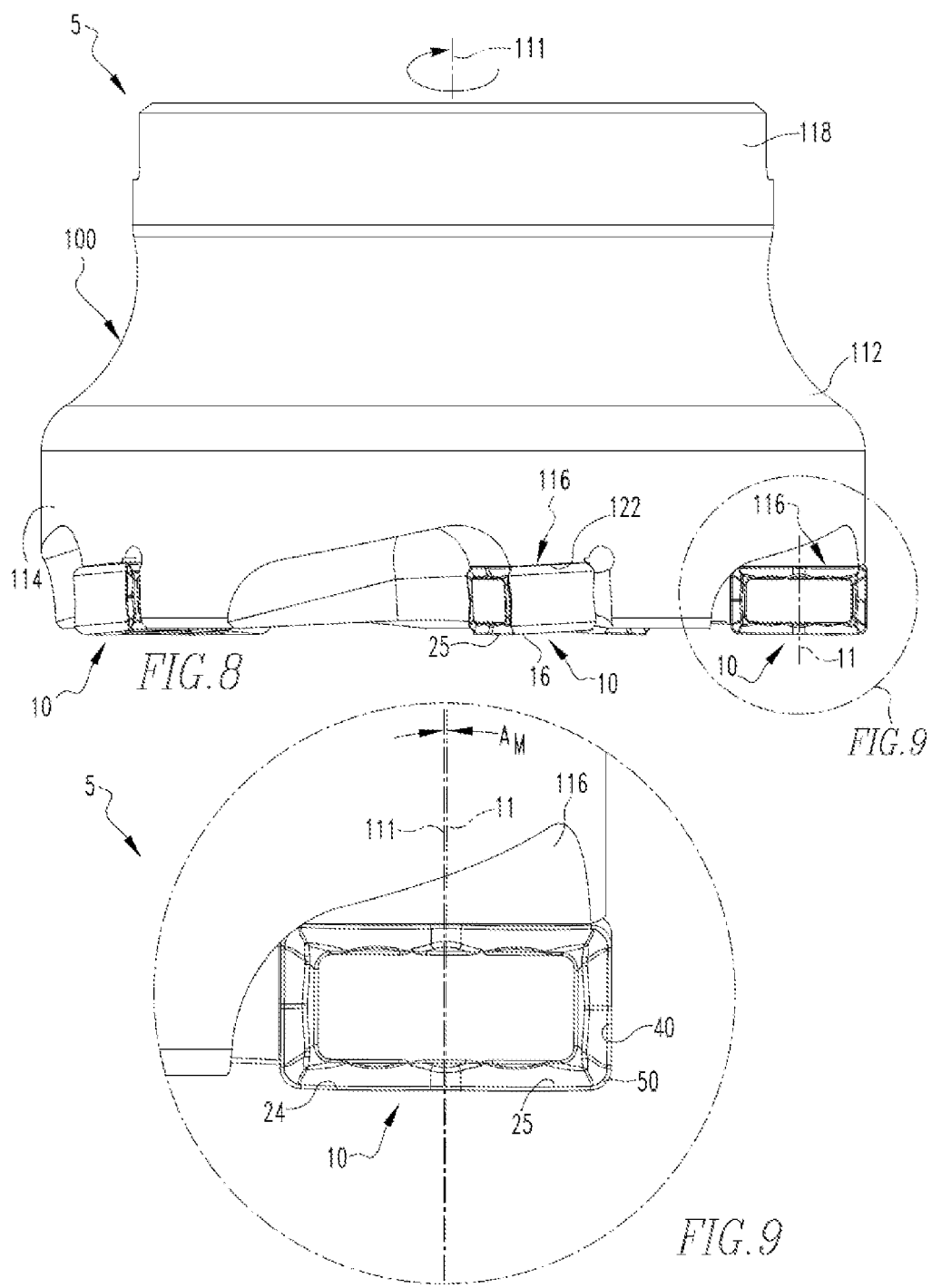

MILLING CUTTING INSERTS

RELATED APPLICATION DATA

The present application claims priority pursuant to 35 U.S.C. § 119(a) to Indian Patent Application Number 202041017679 filed Apr. 24, 2020 which is incorporated herein by reference in its entirety.

FIELD

The present invention relates to cutting tools, including cutting tool holders and cutting inserts. In particular, the present invention relates to indexable, double-sided, tangential milling cutting inserts with cutting edges and wiper edges.

BACKGROUND

Indexable cutting inserts for cutting tools include, for example, cutting inserts made of carbide, ceramic, coated carbide, coated ceramic, or other hard materials. Such inserts generally have multiple cutting edges located at various corners or around peripheral edges of the inserts. In a conventional arrangement, cutting inserts are mechanically secured to a tool holder, and are removable in relation to the tool holder, and may be readily re-positioned (i.e., indexed) to present a fresh and new cutting edge to engage a workpiece. Many indexable cutting inserts are single-handed, either right handed or left handed, due to the geometrical constraints of cutting inserts.

There have been increasing demands for reduced cost and high productivity in metal machining industries. Two common approaches in the design of indexable cutting inserts, from geometrical point of view, are either to design a double-sided cutting insert, or to design more available cutting edges on a single-sided cutting insert. Double-sided cutting inserts can double the number of available cutting edges, and have cost reduction benefits for both cutting tool end users and cutting tool manufacturers. An ideal solution to a productive indexable cutting insert design can be an indexable cutting insert that has both more available cutting edges and is double-sided. However, the geometric design of a double-sided cutting insert for milling is a more challenging task compared to a traditional single-sided cutting insert, because of the complexity of positioning a double-sided cutting insert in an insert pocket on a cutting tool holder. The difficulty increases as the number of cutting edges increases. Furthermore, the design of a single-handed double-sided cutting insert with more indexable cutting edges for milling operations is even more challenging because the two sides of a single-handed double-sided cutting insert may not be a simple mirror image of each other.

Conventional cutting inserts for the milling of 90 degree shoulders may be limited to a total of four cutting edges and four wiper edges.

SUMMARY

Cutting inserts having eight cutting edges and eight wiper edges are provided. At least two cutting edges or two wiper edges may be provided on alternating sides of the cutting insert. The cutting edges and wiper edges are structured and arranged to allow the cutting insert to be used in both right handed and left handed cutting tool holders. Cutting tool holders are also provided to engage and secure the indexable cutting inserts.

An aspect of the present invention is to provide an indexable cutting insert comprising a first face, a second face opposite the first face, a first pair of opposing side surfaces, a second pair of opposing side surfaces and a corner radius connecting each of the first pair of opposing side surfaces to each of the second pair of opposing side surfaces, a first wiper edge and a second wiper edge formed at an intersection between each of the first and second faces and each of the first pair of opposing side surfaces, a first cutting edge and a second cutting edge formed at an intersection between each of the first and second faces and each of the second pair of opposing side surfaces, and corner edge portion formed at an intersection between each of the first and second faces and each corner radius.

Another aspect of the present invention is to provide an indexable tangential cutting insert comprising four right handed cutting regions, and four left handed cutting regions, wherein the cutting insert is interchangeable between a first left handed cutting tool holder and a second right handed cutting tool holder.

A further aspect of the present invention is to provide a cutting tool system comprising a cutting tool holder having a central longitudinal rotational axis, and comprising at least one insert pocket in a cutting end, the at least one insert pocket comprising a bottom seating surface, a first sidewall portion extending generally perpendicularly from the bottom seating surface, and an indexable cutting insert mounted in the at least one pocket, the indexable cutting insert comprising a first face, a second face opposite the first face, a first pair of opposing side surfaces, a second pair of opposing side surfaces and a corner radius connecting each of the first pair of opposing side surfaces to each of the second pair of opposing side surfaces, a first wiper edge and a second wiper edge formed at an intersection between each of the first and second faces and each of the first pair of opposing side surfaces, a first cutting edge and a second cutting edge formed at an intersection between each of the first and second faces and each of the second pair of opposing side surfaces, and corner edge portion formed at an intersection between each of the first and second faces and each corner radius.

These and other aspects of the present invention will be more apparent from the following description.

BRIEF DESCRIPTION OF THE DRAWINGS

FIG. 8 is a front view of a cutting tool system comprising a tool holder and a plurality of cutting inserts in accordance with an embodiment of the present invention.

FIG. 9 is an enlarged view of the circled area of the cutting tool system of FIG. 8.

DETAILED DESCRIPTION

As used herein, the terms "right hand" and "right handed" refer to features of cutting inserts that are oriented so that they can effectively cut a workpiece when a tool holder is rotated in a right handed or counterclockwise direction as viewed from the cutting end of the tool holder. As used herein, the terms "left hand" and "left handed" refer to features of cutting inserts that are oriented so that they can effectively cut a workpiece when a tool holder is rotated in a left handed or clockwise direction as viewed from the cutting end of the tool holder.

Figure 1:
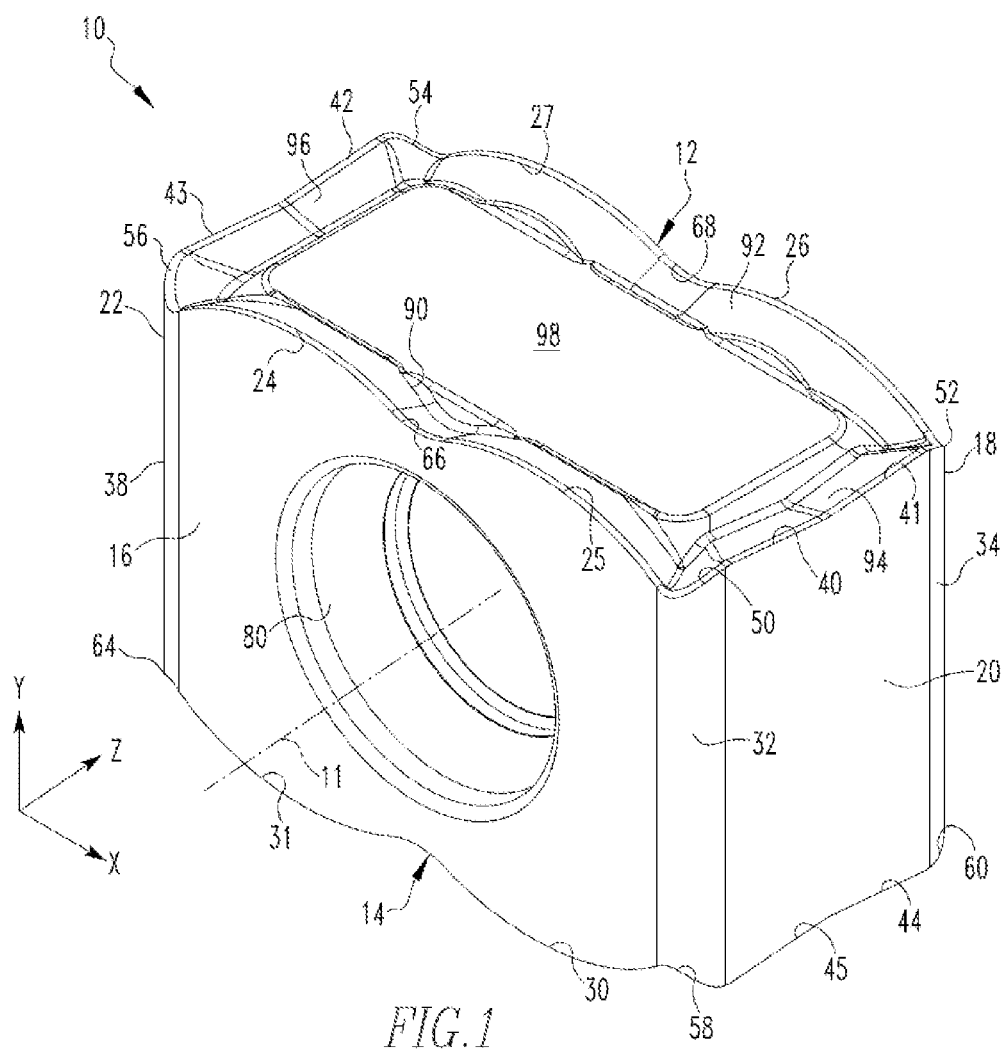
FIG. 1 is a front isometric view of a cutting insert in accordance with an embodiment of the present invention.
Figure 2:
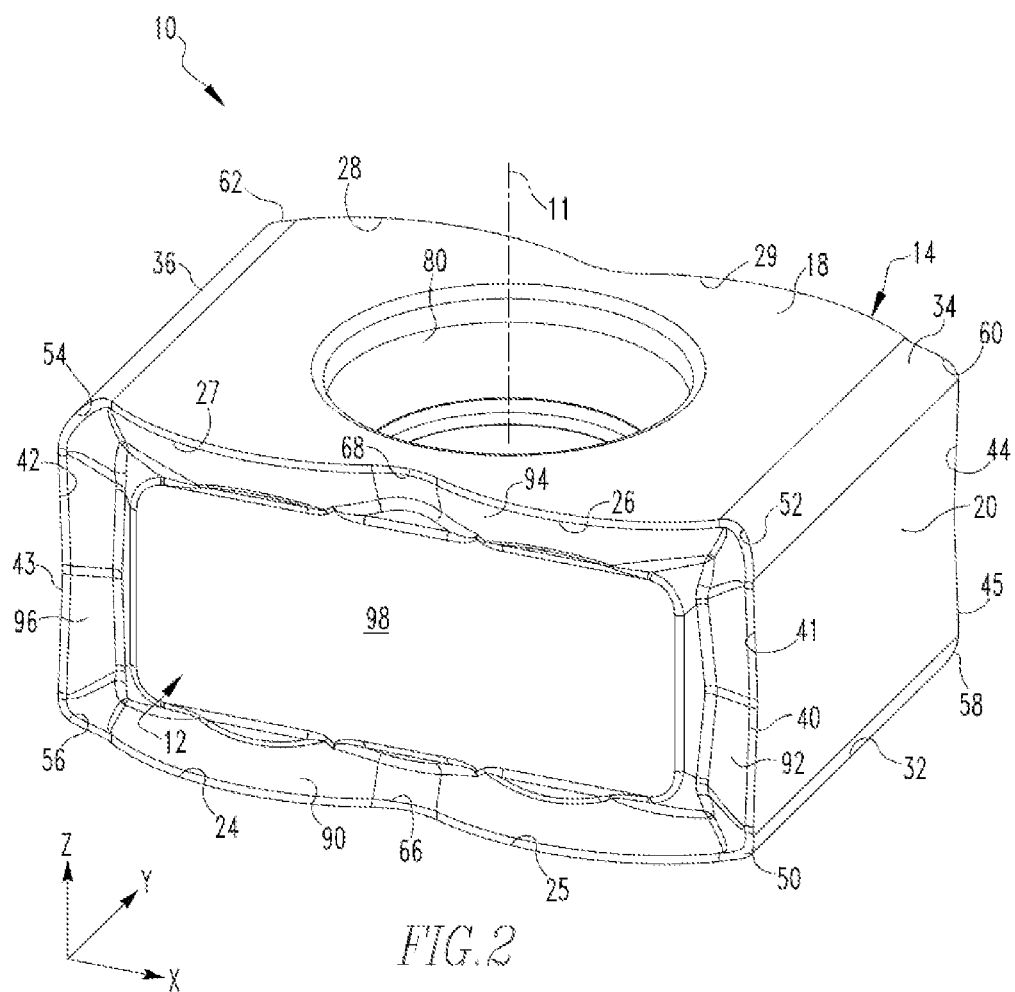
FIG. 2 is a top isometric view of the cutting insert of FIG. 1.

FIGS. 1 and 2 are front and top isometric views of a double-sided indexable cutting insert 10 in accordance with an embodiment of the present invention. The cutting insert 10 may be an on-edge style tangential milling cutting insert. The cutting insert includes a first face 12 and a second face 14 opposite the first face 12, and side surfaces 16, 18, 20, 22. While a generally rectangular cutting insert 10 is shown in this embodiment, any other suitable shape of cutting insert may be used, e.g., square, diamond, or the like. The side surfaces 16, 18, 20, 22 serve as seating surfaces when the cutting insert 10 is mounted in a cutting tool holder, such as a milling cutter that is described below. In accordance with an embodiment of the present invention, side surfaces 16 and 18 may form a first pair of opposing side surfaces and side surfaces 20 and 22 may form a second pair of opposing side surfaces. As shown in FIGS. 1, 2, 3 and 5, the cutting insert 10 includes a central longitudinal axis 11 that runs in a Z-axis direction, a second axis 13 that runs in a Y-axis direction perpendicular to the central longitudinal axis 11 and parallel to the planes of the side surfaces 16, 18, 20, 22, and a third axis 15 that runs in a X-direction perpendicular to both the central longitudinal axis 11 and the second axis 13 and parallel to the planes of the side surfaces 16 and 18. In accordance with an embodiment of the present invention, the cutting insert 10 is a double-sided insert in which the first face 12 is substantially identical to the second face 14. The cutting insert 10 is 180-degree rotationally symmetric about the central longitudinal axis 11. Therefore, only the first face 12 may be described below for brevity. As is known in the art, the first face 12 may become the top surface and the second face may become the bottom surface when mounted within a tool holder, and vice versa.

Figure 3:
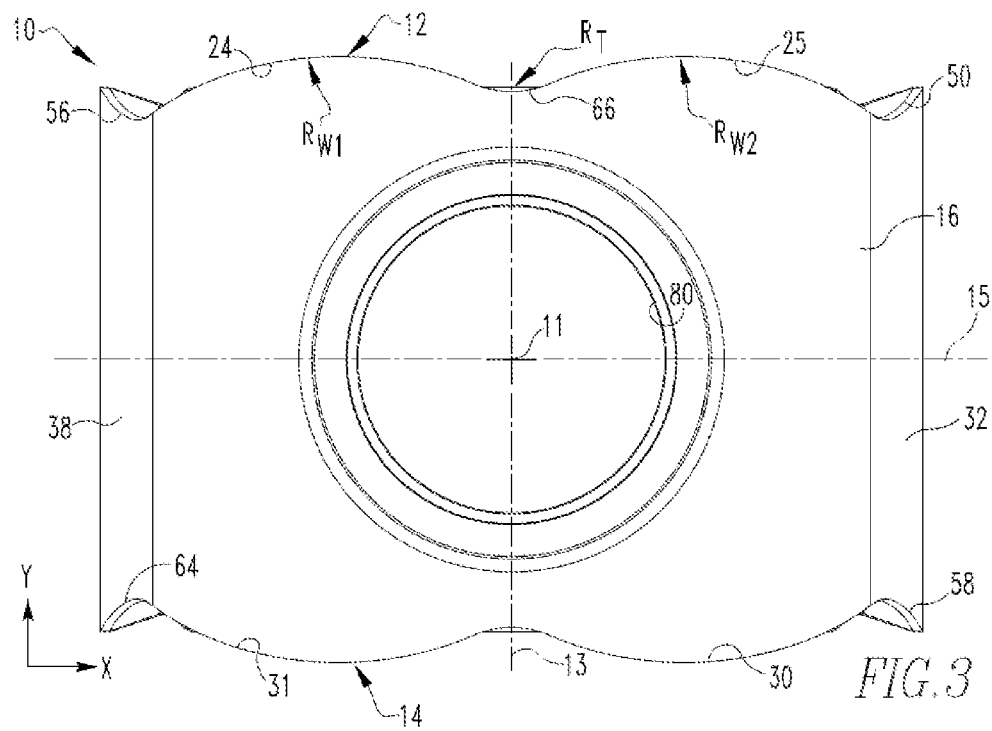
FIG. 3 is a front view of the cutting insert of FIG. 1.
Figure 4:
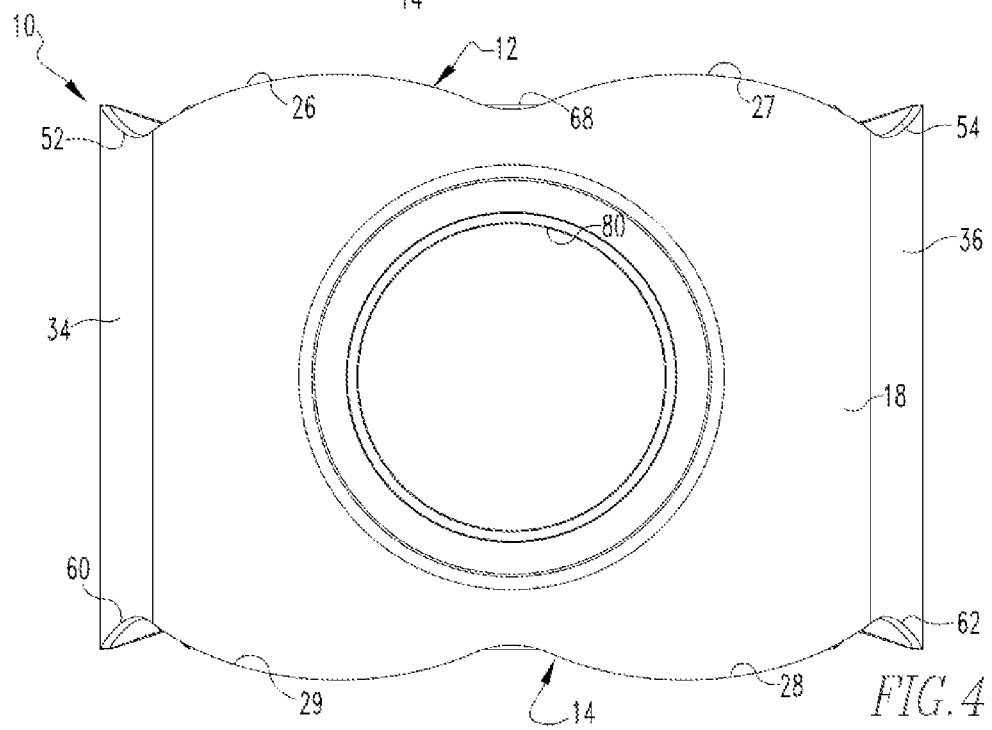
FIG. 4 is a rear view of the cutting insert of FIG. 1.

As shown in FIGS. 1-4, the cutting insert 10 comprises a mounting through hole 80 extending from the side surface 16 to the side surface 18. The mounting through hole 80 is adapted to receive a fastener (not shown) for mounting the cutting insert 10 in a cutting tool holder as shown in FIGS. 8 and 9. As shown in FIGS. 3 and 4, the mounting through hole 80 is centrally located in the side surfaces 16 and 18 and the central longitudinal axis 11, passes through the center of the mounting through hole 80, and the second axis 13 and the third axis 15 intersect the central longitudinal axis 11 at the center of the mounting through hole 80, as shown in FIG. 3. Thus, all three X, Y and Z-axes intersect at the center of the mounting through hole 80. In accordance with an embodiment of the present invention, the second axis 13 may extend through the cutting insert 10 at a midpoint of the side surfaces 20 and 22.

As shown in FIGS. 1, 2, 6 and 7, the cutting insert 10 comprises a first corner radius 32 formed between the side surface 16 and the side surface 20, a second corner radius 34 formed between the side surface 20 and the side surface 18, a third corner radius 36 formed between the side surface 18 and the side surface 22, and a fourth corner radius 38 formed between the side surface 22 and the side surface 16.

In accordance with an embodiment of the present invention, the features of the first face 12 and the second face 14 of the cutting insert 10 are 180-degree rotationally symmetric about the second axis 13. As shown in FIGS. 1 and 2, the cutting insert 10 includes a first wiper edge 24 and a second wiper edge 25 at the intersection between the side surface 16 and the first face 12. The cutting insert 10 also includes a first wiper edge 26 and a second wiper edge 27 at the intersection between the side surface 18 and the first face 12. As shown in FIGS. 1 and 2, the cutting insert 10 includes a first wiper edge 28 and a second wiper edge 29 at the intersection between the side surface 16 and the second face 14. The cutting insert 10 also includes a first wiper edge 30 and a second wiper edge 31 at the intersection between the side surface 18 and the second face 14. Thus, the double-sided cutting insert 10 includes a total of eight wiper edges.

Figure 7:
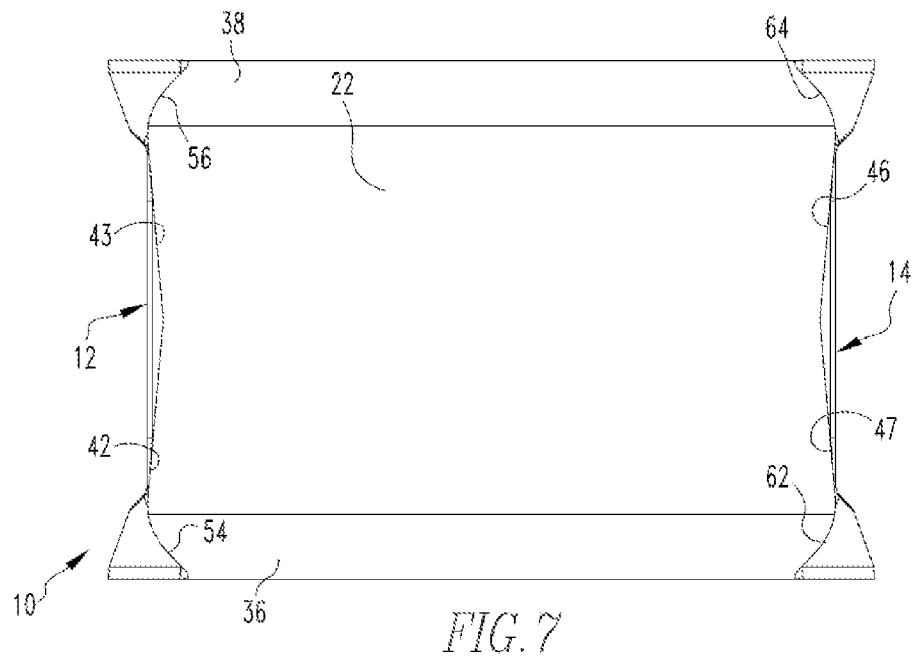
FIG. 7 is a right side view of the tangential cutting insert of FIG. 1.

As shown in FIGS. 1 and 2, the cutting insert 10 includes a first cutting edge 40 and a second cutting edge 41 at the intersection between the side surface 20 and the first face 12, and a first cutting edge 42 and a second cutting edge 43 at the intersection between the side surface 22 and the first face 12. As shown in FIGS. 1 and 7, the cutting insert 10 includes a first cutting edge 44 and a second cutting edge 45 at the intersection between the side surface 20 and the second face 14, and a first cutting edge 46 and an second cutting edge 47 at the intersection between the side surface 22 and the second face 14. Thus, the double-sided cutting insert 10 includes a total of eight cutting edges. In the embodiment shown, the first and second cutting edges are substantially linear. However, any other suitable shape of cutting edge may be used, e.g., the cutting edges may be concave, convex, sinusoidal, serrated or the like.

Figure 6:
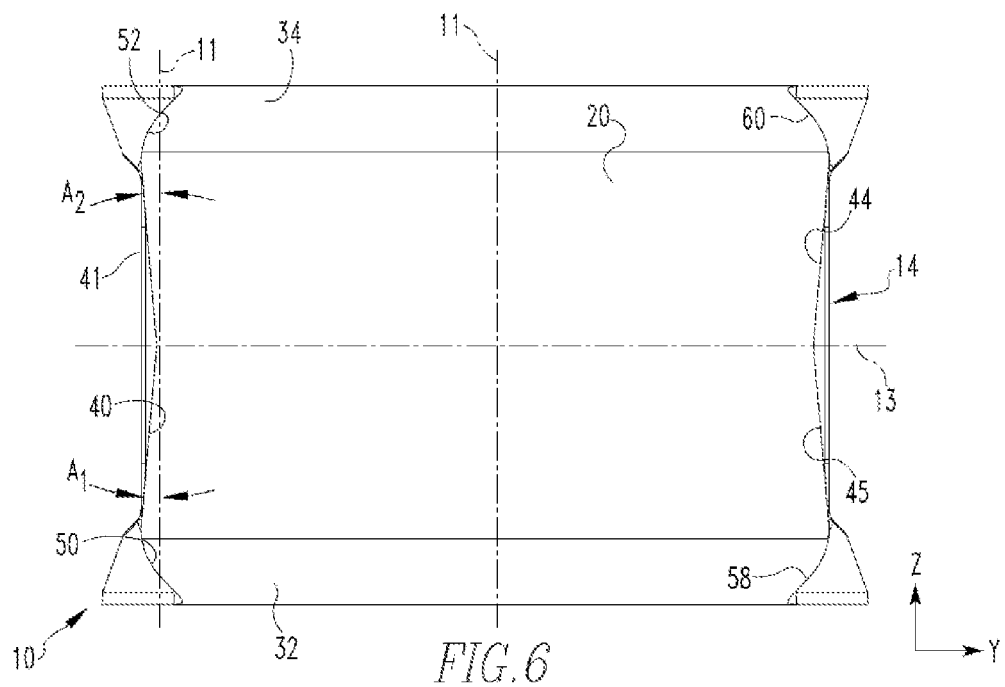
FIG. 6 is a left side view of the tangential cutting insert of FIG. 1.

As shown in FIGS. 1 and 2, the cutting insert 10 includes a corner edge portion 50 at the intersection between the first corner radius 32 and the first face 12, a corner edge portion 52 at the intersection between the second corner radius 34 and the first face 12, a corner edge portion 54 at the intersection between the third corner radius 36 and the first face 12 and a corner edge portion 56 at the intersection between the fourth corner radius 38 and the first face 12. As shown in FIGS. 1, 6 and 7, the cutting insert includes a corner edge portion 58 at the intersection between the first corner radius 32 and the second face 14, a corner edge portion 60 at the intersection between the second corner radius 34 and the second face 14, a corner edge portion 62 at the intersection between the third corner radius 36 and the second face 14 and a corner edge portion 64 at the intersection between the fourth corner radius 38 and the second face 14. In accordance with an embodiment of the present invention, each corner edge portion may connect a wiper edge to an adjacent cutting edge, as further described below.

Figure 5:
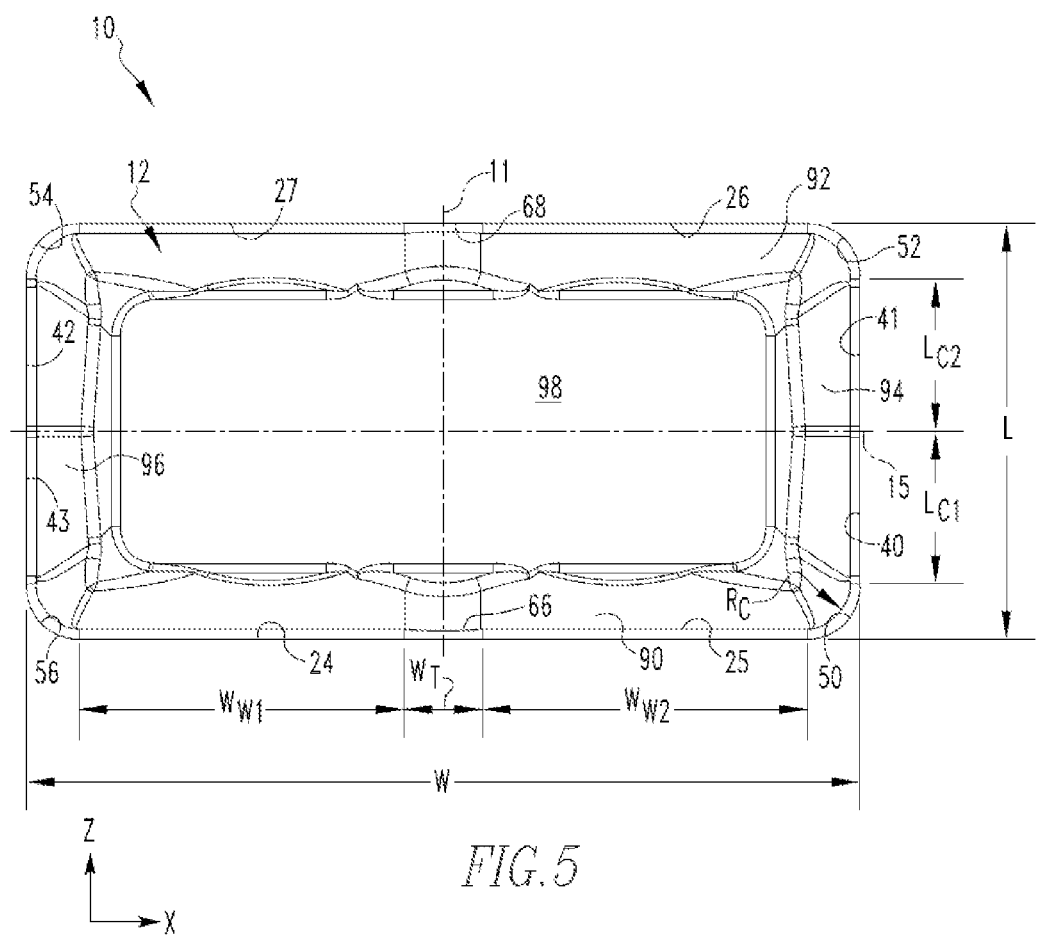
FIG. 5 is a top view of the cutting insert of FIG. 1.

As shown in FIGS. 1, 2 and 5, the first face 12 includes a rake face 90 extending inwardly from the first wiper edge 24 and the second wiper edge 25, a rake face 92 extending inwardly from the first wiper edge 26 and the second wiper edge 27, a rake face 94 extending inwardly from the first cutting edge 40 and the second cutting edge 41, a rake face 96 extending inwardly from the first cutting edge 42 and the second cutting edge 43, and a planar seating surface 98 between the rake faces 90, 92, 94 and 96. Because the cutting insert 10 is 180-degree rotationally symmetric about the third axis 15, it will be understood that the second face 14 of the cutting insert 10 includes four rake faces and a planar seating surface.

As shown in FIG. 5, the cutting insert 10 has a total length L measured along the central longitudinal axis 11 and a total width W measured along the third axis 15. In accordance with an embodiment of the present invention, any suitable total length L and total width W of the cutting insert 10 may be used. In accordance with an embodiment of the present invention, the cutting insert 10 may have any suitable height along the second axis 13.

As shown in FIGS. 1, 2 and 3, the intersection between the side surface 16 and the first face 12 comprises the first wiper edge 24, the second wiper edge 25 and a transitional edge 66 connecting the first wiper edge 24 to the second wiper edge 25. As shown in FIGS. 1 and 3, the first wiper edge 24 extends from the corner edge portion 56 to the transitional edge 66 and the second wiper edge 25 extends from the transitional edge 66 to the corner edge portion 50. As shown in FIGS. 1 and 2, the corner edge portion 50 connects the second wiper edge 25 and the first cutting edge 40 at the intersection between the side surface 20 and the first face 12. As shown in FIGS. 1, 2 and 6, the intersection between the side surface 20 and the first face 12 comprises the first cutting edge 40 and the second cutting edge 41. As shown in FIGS. 1 and 6, the first cutting edge 40 extends from the corner edge portion 50 to the second cutting edge 41 and the second cutting edge 41 extends from the first cutting edge 40 to the corner edge portion 52. As shown in FIG. 1, the corner edge portion 52 connects the second cutting edge 41 to the first wiper edge 26 at the intersection between the side surface 18 and the first face 12. As shown in FIGS. 1 and 3, the intersection between the side surface 18 and the first face 12 comprises the first wiper edge 26, the second wiper edge 27 and a transitional edge 68 connecting the first wiper edge 26 to the second wiper edge 27. As shown in FIGS. 1 and 2, the first wiper edge 26 extends from the corner edge portion 54 to the transitional edge 68 and the second wiper edge 27 extends from the transitional edge 68 to the corner edge portion 56. As shown in FIGS. 1 and 2, the corner edge portion 56 connects the second wiper edge 27 and the first cutting edge 42 at the intersection between the side surface 22 and the first face 12. As shown in FIGS. 1, 2 and 7, the intersection between the side surface 22 and the first face 12 comprises the first cutting edge 42 and the second cutting edge 43. As shown in FIGS. 1 and 7, the first cutting edge 42 extends from the corner edge portion 56 to the second cutting edge 43 and the second cutting edge 43 extends from the first cutting edge 42 to the corner edge portion 56.

In accordance with an embodiment of the present invention, the intersection between the side surface 16 and the first face 12 may be identical to the intersections between the side surface 16 and the second face 14, the side surface 18 and the first face 12, and the side surface 18 and the second face 14. Thus, only the intersection between the side surface 16 and the first face 12 will be described herein for brevity, and it will be appreciated that any description herein of the intersection between the side surface 16 and the first face 12 applies to the intersections between the side surface 16 and the second face 14, the side surface 18 and the first face 12, and the side surface 18 and the second face 14. As shown in FIG. 3, the first wiper edge 24 and the second wiper edge 25 may each include a convex portion in the Y-axis direction and the transitional edge 66 may include a concave portion in the Y-axis direction. However, any other suitable shape and arrangement of wiper edges and transitional edge may be used, e.g., straight, convex, concave, complex curved or the like. In accordance with another embodiment of the present invention, the first wiper edge 24 may intersect directly with the second wiper edge 25.

As shown in FIG. 3, the central portion of the first wiper edge 24 may extend a greater distance in the Y-axis direction than the outer portions of the first wiper edge 24 adjacent to the corner edge portion 56 and the transitional edge 66. As shown in FIG. 3, the central portion of the second wiper edge 25 may extend a greater distance in the Y-axis direction than the outer portions of the second wiper edge 25 adjacent to the transitional edge 66 and the corner edge portion 50. The first wiper edge 24 may be formed with a radius, $R_{W1}$, as shown in FIG. 3. For example, the radius $R_{W1}$ may typically range from about 3 to about 10 mm, from about 4 to about 7 mm, or from about 5 to about 6 mm. In a particular embodiment, the radius $R_{W1}$ is about 5.5 mm. The second wiper edge 25 may be formed with a radius, $R_{W2}$, as shown in FIG. 3. For example, the radius $R_{W2}$ may typically range from about 3 to about 10 mm, from about 4 to about 7 mm, or from about 5 to about 6 mm. In a particular embodiment, the radius $R_{W2}$ is about 5.5 mm. In accordance with an embodiment of the present invention, the of the first wiper edge radius $R_{W1}$ may be equal to the second wiper edge radius $R_{W2}$. Alternatively, the first and second wiper edge radii may be different.

In accordance with an embodiment of the present invention, the outer portions of the transitional edge 66 adjacent to the first wiper edge 24 and the second wiper edge 25 may extend a greater distance in the Y-axis direction than the central portion of the transitional edge 66. The concave transitional edge 66 may be formed with a radius, RT, as shown in FIG. 3. For example, the transitional edge radius RT may typically range from about 0.1 to about 4 mm, from about 0.5 to about 3 mm, or from about 1 to about 2 mm. In a particular embodiment, the radius RT is about 1.5 mm. In accordance with an embodiment of the present invention, the first wiper edge radius $R_{W1}$, the second wiper edge radius $R_{W2}$ and the transitional edge radius RT are selected to allow the desired portion of the wiper edge to contact the work piece during a cutting operation.

As shown in FIG. 5, the first wiper edge 24 has a width $W_{W1}$, the second wiper edge 25 has a width $W_{W2}$ and the transitional edge 66 has a width $W_T$. In accordance with an embodiment of the present invention, the first wiper edge width $W_{W1}$ may typically range from 5 to 60 percent of the total width W, or from 10 to 50 percent of the total width W, or from 25 to 45 percent of the total width W of the cutting insert 10. In accordance with an embodiment of the present invention, the second wiper edge width $W_{W2}$ may typically range from 5 to 60 percent of the total width W, or from 10 to 50 percent of the total width W, or from 25 to 45 percent of the total width W of the cutting insert 10. In accordance with an embodiment of the present invention, the first wiper edge width $W_{W1}$ may be equal to the second wiper edge width $W_{W2}$. Alternatively, the first and second wiper edge widths may be different. In accordance with an embodiment of the present invention, the first wiper edge width $W_{W1}$, the second wiper edge width $W_{W2}$ and the transitional edge width $W_T$ may be varied depending on the overall width W of the cutting insert 10. For example, if the overall width W of the cutting insert 10 is increased the first wiper edge width $W_{W1}$, the second wiper edge width $W_{W2}$ and the transitional edge width $W_T$ may increase. Alternatively, if the overall width W of the cutting insert 10 is decreased the first wiper edge width $W_{W1}$, the second wiper edge width $W_{W2}$ and the transitional edge width $W_T$ may decrease.

In accordance with an embodiment of the present invention, the intersection between the first corner radius 32 and the first face 12 may be identical to the intersections between the first corner radius 32 and the second face 14, the second corner radius 34 and the first face 12 and the second face 14, the third corner radius 36 and the first face 12 and the second face 14, and the fourth corner radius 38 and the first face 12 and the second face 14. Thus, only the intersection between the first corner radius 32 and the first face 12 will be described herein for brevity, and it will be appreciated that any description herein of the intersection between the first corner radius 32 and the first face 12 applies to each intersection between a corner radius 32, 34, 36 and 38 and the first face 12 and the second face 14. As shown in FIGS. 1, 2, 3 and 5, the corner edge portion 50 at the intersection between the first corner radius 32 and the first face 12 connects the second wiper edge 25 to the first cutting edge 40. In accordance with an embodiment of the present invention, the corner edge portion 50 comprises concave curved portion formed with the second wiper edge 25 and a convex curved portion formed with the first cutting edge segment 40. In accordance with an embodiment of the present invention, the portion of the corner edge portion 50 adjacent to the first cutting edge 41 may extend a greater distance in the Y-axis direction than the portion of the corner edge portion 50 adjacent to the second wiper edge 25. As shown in FIG. 5, the corner edge portion 50 is formed as a rounded segment having a radius $R_C$. For example, the radius $R_C$ of each corner edge portion may typically range from 0.1 to 4 mm, or from 0.4 to 2 mm. In a particular embodiment, the radius $R_C$ of each corner edge portion may be about 0.8 mm.

In accordance with an embodiment of the present invention, the intersection between the side surface 20 and the first face 12 may be identical to the intersections between the side surface 20 and the second face 14, the side surface 22 and the first face 12, and the side surface 22 and the second face 14. Thus, only the intersection between the side surface 20 and the first face 12 will be described herein for brevity, and it will be appreciated that any description herein of the intersection between the side surface 20 and the first face 12 applies to the intersections between side surface 20 and the second face 14, the side surface 22 and the first face 12, and the side surface 22 and the second face 14. In accordance with an embodiment of the present invention, the first cutting edge 40 and the second cutting edge 41 are mirror symmetric about the Y-axis. As shown in FIG. 6, the first cutting edge 40 extends between the corner edge portion 50 and a midpoint of the side surface 20 at the second axis 13 and the second cutting edge 41 extends between the midpoint of the side surface 20 at the second axis 13 and the corner edge portion 52. As shown in FIGS. 1 and 6, the first cutting edge 40 and the second cutting edge 41 may meet at the midpoint of the side surface 20. In accordance with an embodiment of the present invention, the first cutting edge 40 may extend a greater distance in the Y-axis direction at the corner edge portion 50 than at the second axis 13, and the second cutting edge 41 may extend a greater distance in the Y-axis direction at the corner edge portion 52 than at the second axis 13. As shown in FIG. 6, the first cutting edge 40 extends from the second axis 13 to the corner edge portion 50 at a first cutting edge angle $A_{C1}$ with respect to the central longitudinal axis 11 that may allow the first cutting edge 40 to be a right handed cutting edge, as further described below. For example, the first cutting edge angle $A_{C1}$ may be at least 0.5 degree, for example, from 1 to 30 degrees, or from 2 to 20 degrees, or from 3 to 10 degrees. As shown in FIG. 6, the second cutting edge 41 extends from the second axis 13 at a second cutting edge angle Ace with respect to the central longitudinal axis 11 that may allow the second cutting edge 41 to be a left handed cutting edge, as further described below. For example, the second cutting edge angle Ace may be at least 0.5 degree, for example, from 1 to 30 degrees, or from 2 to 20 degrees, or from 3 to 10 degrees. In accordance with an embodiment of the present invention, the first cutting edge angle $A_{C1}$ may be equal to the second cutting edge angle Ace. Alternatively, the first and second cutting edge angles may be different.

As shown in FIG. 6, the first cutting edge 40 has a length $L_{C1}$ and the second cutting edge 41 has a length $L_{C2}$. In accordance with an embodiment of the present invention, the first cutting edge length $L_{C1}$ and the second cutting edge length $L_{C2}$ are selected to determine the axial depth of cut for the cutting insert 10. As shown in FIG. 5, the first cutting edge length $L_{C1}$ extends between the corner edge portion 50 and the third axis 15 and the second cutting edge length $L_{C2}$ extends between the third axis 15 and the corner edge portion 52. In accordance with an embodiment of the present invention, the first cutting edge length $L_{C1}$ may typically range from 5 to 60 percent of the total length L, or from 10 to 50 percent of the total length L, or from 25 to 45 percent of the total length L of the cutting insert 10. In accordance with an embodiment of the present invention, the second cutting edge length $L_{C2}$ may typically range from 5 to 60 percent of the total length L, or from 10 to 50 percent of the total length L, or from 25 to 45 percent of the total length L of the cutting insert 10. In accordance with an embodiment of the present invention, the first cutting edge length $L_{C1}$ may be equal to the second cutting edge length $L_{C2}$. Alternatively, the first and second cutting edge lengths may be different. In accordance with an embodiment of the present invention, the first cutting edge length $L_{C1}$ and the second cutting edge length $L_{C2}$ may be varied depending on the overall length L of the cutting insert 10. For example, if the overall length L of the cutting insert 10 is increased the first cutting edge length $L_{C1}$ and the second cutting edge length $L_{C2}$ may increase. Alternatively, if the overall length L of the cutting insert 10 is decreased the first cutting edge length $L_{C1}$ and the second cutting edge length $L_{C2}$ may decrease.

In accordance with an embodiment of the present invention, each corner edge portion and its adjacent wiper edge and cutting edge form a cutting region. As shown in FIG. 1, the corner edge portion 50, the second wiper edge 25 and the first cutting edge 40 form a cutting region. In certain embodiments, the first face 12 may include four cutting regions and the second face 14 may include four cutting regions. Thus, the cutting insert 10 may include a total of eight cutting regions. In accordance with an embodiment of the present invention, the first face 12 may include two right handed cutting regions and two left handed cutting regions. Because the cutting insert 10 is 180-degree rotationally symmetric about the second axis 13, the two right handed cutting regions are located at diagonally opposite corner edges of the first face 12 and the second face 14. For example, as shown in FIGS. 1 and 2, the cutting edge sections including corner edge portions 50 and 54 may be right handed cutting edge sections and the cutting edge sections 52 and 56 may be left handed cutting edge sections. As further described below, the cutting insert 10 may be indexed four times in left handed tool holder to allow each left handed cutting edge region to be an active cutting region and four times in a right handed tool holder to allow each right handed cutting region to be an active cutting region. The cutting insert 10 may therefore be interchangeable between left handed tool holders and right handed tool holders. The same cutting insert 10 may be used in both left handed and right handed tool holders.

In the embodiment shown, the corner edge portions 52, 56, 58 and 62, first wiper edges 24, 26, 28 and 30 and the second cutting edges 41, 43, 45 and 47 of the cutting insert 10 may each form a part of the left handed cutting regions of the cutting insert 10. The corner edge portions 50, 54, 56 and 60, second wiper edges 25, 27, 29 and 31 and the first cutting edges 40, 42, 44 and 46 of the cutting insert 10 may each form a part of the right handed cutting regions of the cutting insert 10.

In accordance with an embodiment of the present invention, the orientation of the wiper edges, corner edge portions and cutting edges allow for the cutting insert 10 to achieve close tolerances during the milling of 90 degree shoulders.

The cutting inserts 10 may be made of any suitable material, such as tool steels, cemented carbides, and superhard material, such as cubic boron nitride (CBN), polycrystalline cubic boron nitride (PCBN), polycrystalline diamonds (PCD), tungsten carbide (WC), cermet, ceramic, and the like. The cutting inserts 10 of the present invention may be fabricated by any suitable technique, such as carbide powder pressing, grinding or additive manufacturing to provide the wiper edges and cutting edges.

Figure 10:
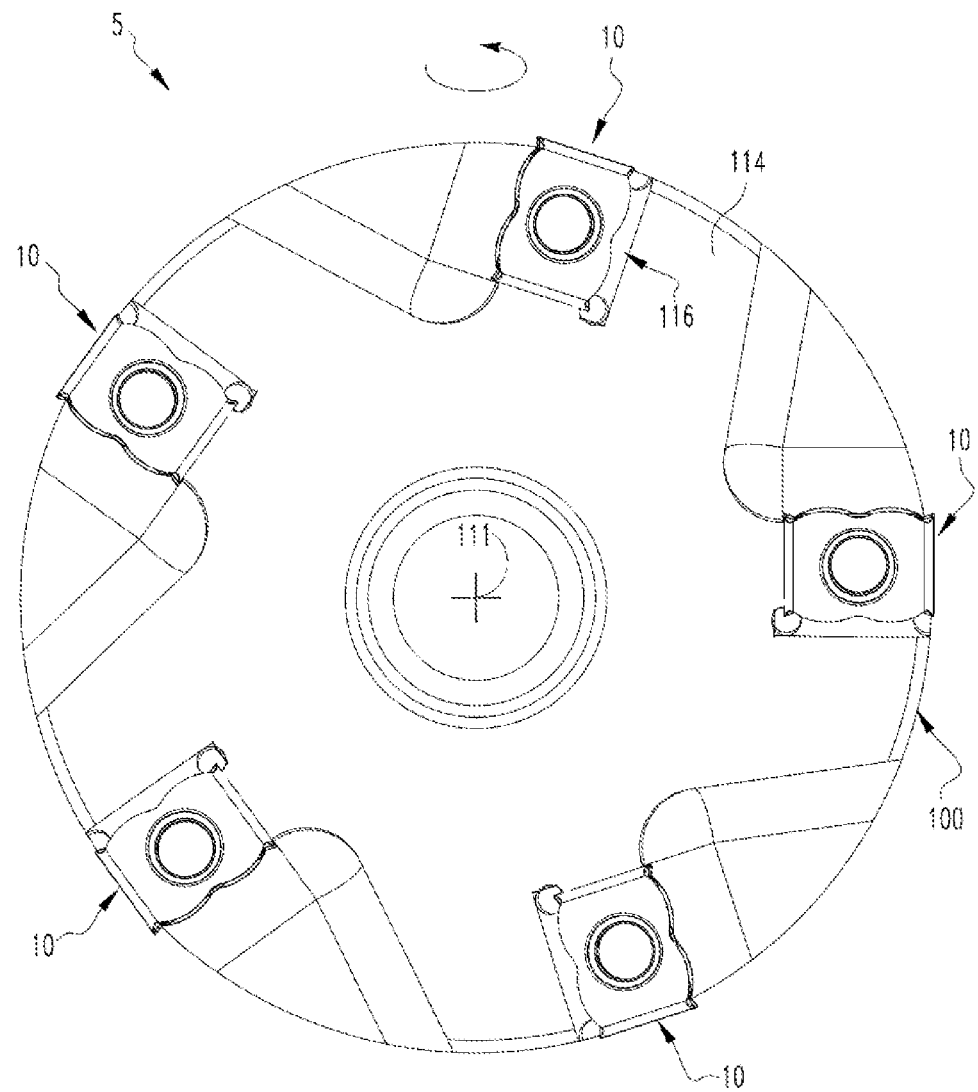
FIG. 10 is a bottom view of the cutting tool system as shown in FIG. 8.
}

FIGS. 8-10 illustrate a cutting tool system 5 in accordance with an embodiment of the present invention. The cutting tool system 5 includes a tool holder 100 and a plurality of cutting inserts 10 tangentially mounted therein. The tool holder 100 comprises a tool body 112 including a cutting end 114 with a plurality of circumferentially-spaced pockets 116, and a mounting end 118 opposite the cutting end 114. The tool body 112 is designed to be rotatably driven about a central longitudinal rotational axis 111. In the embodiment shown, the tool holder 100 is commonly known as a right-hand milling cutter and includes a total of five pockets 116. However, it will be appreciated that the invention is not limited by the number of pockets 116, and that the invention can be practiced with any desirable number of pockets that provide the desired cutting capabilities. Each of the pockets 116 can receive a cutting insert, which is securely held in the pocket 116 by means of an insert screw (not shown). However, any other suitable method of securing the cutting insert in the pocket may be used, e.g., clamping studs, clamping wedges, bolts, pins, or the like. In the embodiment shown, each of the pockets 116 of the tool holder 100 receive a single cutting insert 10.

Figure 11:
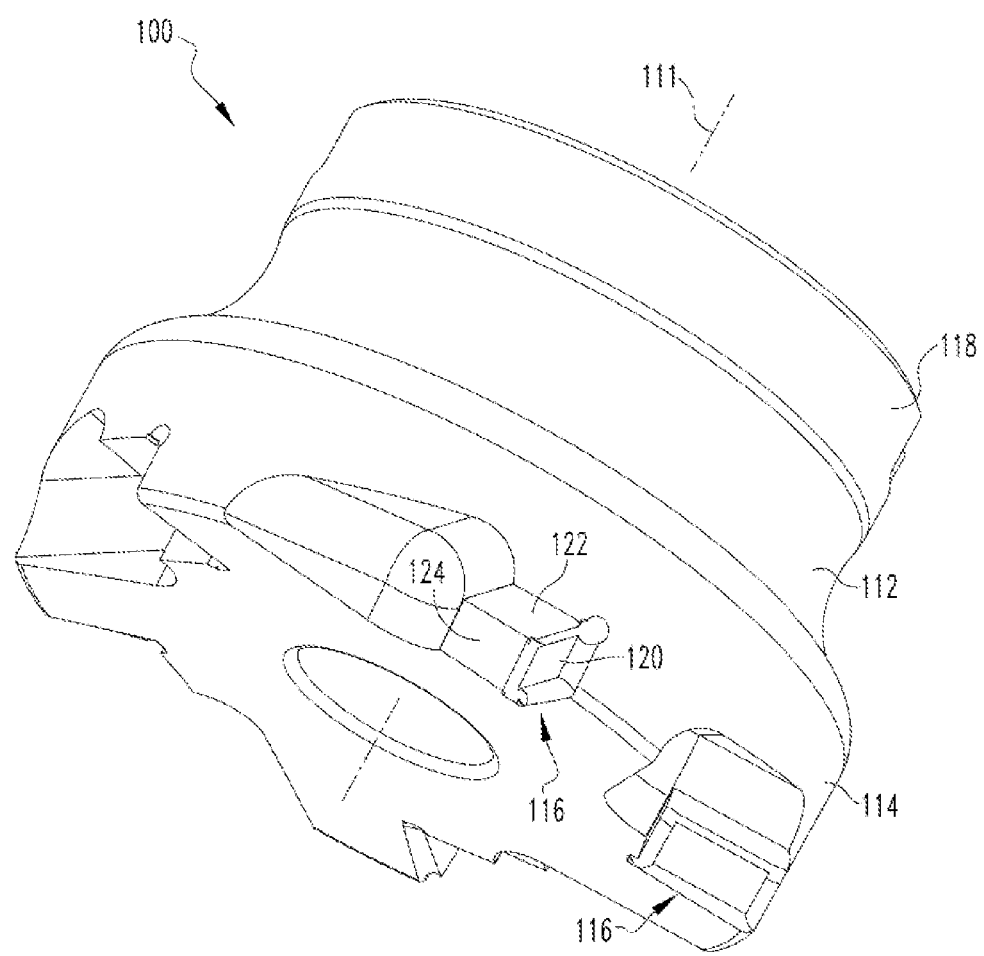
FIG. 11 is an isometric view of a tool holder in accordance with an embodiment of the present invention.

As shown in FIG. 11, the pockets 116 of the tool holder 100 each include a bottom seating surface 120, a first sidewall portion 122 and a second sidewall portion 124. In the embodiment shown, the first sidewall portion 122 may extend generally perpendicularly from the bottom seating surface 120 and the second sidewall portion 124 may extend generally perpendicularly from the bottom seating surface 120 and the first sidewall portion 122. In accordance with an embodiment of the present invention, the first sidewall portion 122 may include a threaded mounting hole (not shown) that may be configured to receive a mechanical fastener (not shown) to secure the cutting insert 10 in the insert pocket 116. In accordance with an embodiment of the present invention, the pockets 116 of the tool holder 100 are structured and arranged to mount the cutting insert 10 at the desired orientation to perform a cutting operation. For example, the cutting insert 10 may have a negative axial rake angle and a negative radial rake angle when mounting in the pocket 116. The negative axial rake angle and the negative radial rake angle may provide positive axial and radial clearance angles for the side surfaces of the cutting insert 10, as further described below.

In accordance with an embodiment of the present invention, a surface of the first sidewall portion 122 may define a plane that extends radially outwardly from the second sidewall portion 124 and circumferentially from the bottom seating surface 120. As shown in FIG. 8, the surface of the first sidewall portion 122 may extend circumferentially from the bottom seating surface 120 not normal to the central longitudinal rotational axis 111 of the tool body 112. The angle at which the first sidewall portion extends circumferentially from the bottom seating surface 120 may position the wiper edges of the cutting insert 10 at a negative axial rake angle when mounted in the pocket 116. The negative axial rake angle created by the first sidewall portion 122 may provide a positive axial clearance angle between the side surfaces 16 and 18 of the cutting insert 10 and a work piece when the cutting insert 10 is mounted in the pocket 116. For example, the first sidewall portion 122 may extend circumferentially from the bottom seating surface 120 to provide a positive axial clearance angle from the horizontal plane of the tool body 112 of at least 0.25 degree. The positive axial clearance angle from the horizontal plane of the tool body may typically range from 0.5 to 15 degrees, or from 1 to 10 degrees, or from 2 to 7.5 degrees. The side surfaces 16 and 18 of the cutting insert 10 may also have the same positive clearance angle with the work piece when mounted in the pocket 116 of the tool holder 100. The positive clearance angle created by the pocket 116 of the tool holder 100 may allow only the wiper edges of the cutting insert 10 to contact the work piece while trailing the side surfaces 16 and 18 avoid contact with the work piece.

In certain embodiments, the surface of the first sidewall portion 122 may extend radially outwardly from the second sidewall portion 124 not normal to the central longitudinal rotational axis 111 of the tool body. For example, the first sidewall portion 122 may extend radially outwardly from the second sidewall portion 124 at an angle with respect to a horizontal axis of the tool body 112. In certain embodiments, the first sidewall portion 122 may extend radially outwardly from the second sidewall portion 124 at an angle of less than 90 degrees with respect to the central longitudinal rotational axis 111 of the tool body 112. The angle at which the first sidewall portion 122 extend radially outwardly from the second sidewall portion 124 may provide a mounting angle $A_M$ between the central longitudinal Z-axis 11 of the cutting insert 10 and the central longitudinal rotational axis 111 of the tool body 112 when the cutting insert 10 is mounted in the pocket 116, as further described below. The second sidewall portion 124 may be normal to the first sidewall portion 122 and as a result may also be provided at an angle with respect to the central longitudinal rotational axis 111 of the tool body 112.

In accordance with an embodiment of the present invention, the orientation of the bottom seating surface 120 and the second sidewall portion 124 may position the cutting edges of the cutting insert 10 at a negative radial rake angle when mounted in the pocket 116. The negative radial rake angle created by bottom seating surface 120 and the second sidewall portion 124 may provide a positive radial clearance angle between the side surfaces 20 and 22 of the cutting insert 10 and a work piece when the cutting insert 10 is mounted in the pocket 116. The positive radial clearance angle created by the pocket 116 of the tool holder 100 may allow only the cutting edges of the cutting insert 10 to contact the work piece while trailing the side surfaces 20 and 22 avoid contact with the work piece.

In accordance with an embodiment of the present invention, the side surfaces 16, 18, 20 and 22 and the planar seating surfaces of the first and second faces 12 and 14 of the cutting insert 10 may engage the pocket 116 when the cutting insert 10 is mounted in the tool body 112 during cutting operations. In certain embodiments, the bottom seating surface 120 may be configured to engage with at least one of the planar seating surfaces of the first and second faces 12 and 14, and the first and second sidewall portions 122 and 124 may be configured to engage with at least two of the side surfaces 16, 18, 20 and 22 of the cutting insert 10. Thus, the cutting insert 10 is mounted in the pocket 116 with at least three points of contact.

In accordance with an embodiment of the present invention, the four right handed cutting regions of the first and second faces 12 and 14 allow the cutting insert 10 to be indexed four times in a right handed tool holder 100, as shown in FIG. 8. The four left handed cutting regions of the first and second faces 12 and 14 allow the cutting insert 10 to then be indexed four times in a left handed tool holder (not shown).

In certain embodiments, the cutting insert 10 may be mounted in the pocket with an angle between the central longitudinal axis 11 of the cutting insert and the central longitudinal rotational axis 111 of the tool body 112. In the embodiment shown in FIG. 8, when the cutting insert 10 is mounted in the pocket 116 of the tool holder 100, the central longitudinal axis 11 forms a mounting angle $A_M$ with respect to the central longitudinal rotational axis 111 of the tool body 112 that may allow a single cutting region to be an active cutting region capable of contacting the work piece in a cutting operation. For example, the mounting angle $A_M$ may be at least 0.01 degree, for example, from 0.1 to 5 degrees, or from 0.15 to 2.5 degrees, or from 0.2 to 1 degree. The mounting angle $A_M$ allows the cutting edge and the wiper edge of the active cutting region to have the required orientation with the work piece. As shown in FIG. 9, the corner edge portion 50, the second wiper edge 25 and the first cutting edge 40 form the active cutting region. The mounting angle $A_M$ may additionally cause the third axis 15 of the cutting insert to form an angle with the horizontal axis of the tool body 112. The mounting angle $A_M$ causes the radially outermost portion of each cutting insert 10 from the central longitudinal rotational axis 111 to have the greatest distance from the tool body 112 along the central longitudinal rotational axis 111.

In accordance with an embodiment of the present invention, only the active cutting region may contact the workpiece (not shown). In certain embodiments, the mounting angle $A_M$ may provide a drop between the lowest point of the active wiper edge and the lowest point of the passive wiper edge along the central longitudinal rotational axis 111. In certain embodiments, the drop between the active wiper edge and the passive wiper edge may be at least 0.005 mm, for example, from 0.01 to 0.2 mm, or from 0.02 to 0.1 mm. In a particular embodiment, the drop may be 0.03 mm. The drop between the active wiper edge and the passive wiper edge prevents the passive wiper edge from contacting the work piece. As shown in FIG. 8, the drop between the second wiper edge 25 of the active cutting region and the adjacent passive first wiper edge 24 caused by the mounting angle $A_M$ allows only the second wiper edge 25 to contact the work piece during a cutting operation.

The tool holder 100 may be made of any suitable material, such as steel, aluminum, titanium or any other material having sufficient strength. The tool holder 10 of the present invention may be fabricated by any suitable technique, such as machining to provide the insert pockets.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

For purposes of the description above, it is to be understood that the invention may assume various alternative variations and step sequences except where expressly specified to the contrary. Moreover, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

The invention claimed is:

1. An indexable cutting insert, comprising:
   a first face, a second face opposite the first face, a first pair of opposing side surfaces, a second pair of opposing side surfaces and a corner radius connecting each of the first pair of opposing side surfaces to each of the second pair of opposing side surfaces;
   a first wiper edge and a second wiper edge formed at an intersection between each of the first and second faces and each of the first pair of opposing side surfaces;
   a first cutting edge and a second cutting edge formed at an intersection between each of the first and second faces and each of the second pair of opposing side surfaces;
   a corner edge portion formed at an intersection between each of the first and second faces and each corner radius; and a transitional edge formed between each of the first and second faces and each of the first pair of opposing side surfaces and connecting the first and second wiper edges, wherein the first and second wiper edges comprise convex portions, and wherein the transitional edge comprises a concave portion extending inward in a plane defined by an adjacent one of the first pair of side surfaces.

2. The indexable cutting insert of claim 1, further comprising a mounting through hole extending through the first pair of opposing side surfaces, the center of the mounting through hole defining a central longitudinal axis.

3. The indexable cutting insert of claim 2, wherein the cutting insert defines a second axis perpendicular to the central longitudinal axis and parallel to the first and second pairs of opposing side surfaces, and a third axis perpendicular to the central longitudinal axis and the second axis.

4. The indexable cutting insert of claim 1, wherein the transitional edge includes a radius ranging from 0.1 millimeters to 4 millimeters.

5. The indexable cutting insert of claim 1, wherein each of the convex portions include a radius ranging from 3 millimeters to 10 millimeters.

6. The indexable cutting insert of claim 1, wherein the corner edge portion connects a wiper edge and a cutting edge, the corner edge portion forming a concave portion with the wiper edge and a convex portion with the cutting edge.

7. The indexable cutting insert of claim 1, wherein the first cutting edge extends from a first corner edge portion to a midpoint of the second pair of side surfaces and the second cutting edge extends from the midpoint of the second pair of side surfaces to a second corner edge portion.

8. The indexable cutting insert of claim 1, wherein the indexable cutting insert is a tangential milling cutting insert.

9. The indexable cutting insert of claim 3, wherein the first cutting edge extends between a midpoint of the second pair of side surfaces and a first corner edge portion at a first cutting edge angle with respect to the central longitudinal axis, and the second cutting edge extends between the midpoint of the second pair of side surfaces and a second corner edge portion at a second cutting edge angle with respect to the central longitudinal axis.

10. The indexable cutting insert of claim 9, wherein the first cutting edge angle is from 1 to 30 degrees and the second cutting edge angle is from 1 to 30 degrees.

11. The indexable cutting insert of claim 3, wherein the first and second faces are 180-degree rotationally symmetric about the second axis.

12. The indexable cutting insert of claim 1, wherein each corner edge portion and the adjacent wiper edge and the adjacent cutting edge form a cutting region.

13. The indexable cutting insert of claim 12, wherein the cutting insert comprises four right handed cutting regions and four left handed cutting regions.

14. An indexable tangential cutting insert, comprising:
a first face, a second face opposite the first face, a first pair of opposing side surfaces, a second pair of opposing side surfaces and a corner radius connecting each of the first pair of opposing side surfaces to each of the second pair of opposing side surfaces;
a first wiper edge and a second wiper edge formed at an intersection between each of the first and second faces and each of the first pair of opposing side surfaces;
a first cutting edge and a second cutting edge formed at an intersection between each of the first and second faces and each of the second pair of opposing side surfaces wherein the first and second cutting edges intersect each other at a location extending inward in a plane defined by an adjacent one of the second pair of side surfaces; and
a corner edge portion formed at an intersection between each of the first and second faces and each corner radius,
wherein each corner edge portion and an adjacent one of the first wiper edges and an adjacent one of the second cutting edges form a cutting region,
wherein the cutting insert includes four right handed cutting regions and four left handed cutting regions, and
wherein the cutting insert is interchangeable between a first left handed cutting tool holder and a second right handed cutting tool holder.

15. A cutting tool system, comprising:
a cutting tool holder having a central longitudinal rotational axis, and comprising at least one insert pocket in a cutting end, the at least one insert pocket comprising a bottom seating surface and a first sidewall portion extending generally perpendicularly from the bottom seating surface; and
an indexable cutting insert mounted in the at least one pocket, the indexable cutting insert comprising:
a first face, a second face opposite the first face, a first pair of opposing side surfaces, a second pair of opposing side surfaces and a corner radius connecting each of the first pair of opposing side surfaces to each of the second pair of opposing side surfaces;
a first wiper edge and a second wiper edge formed at an intersection between each of the first and second faces and each of the first pair of opposing side surfaces;
a first cutting edge and a second cutting edge formed at an intersection between each of the first and second faces and each of the second pair of opposing side surfaces;
a corner edge portion formed at an intersection between each of the first and second faces and each corner radius; and
a transitional edge formed between each of the first and second faces and each of the first pair of opposing side surfaces and connecting the first and second wiper edges,
wherein the first and second wiper edges comprise convex portions, and
wherein the transitional edge comprises a concave portion extending inward in a plane defined by an adjacent one of the first pair of side faces.

16. The cutting tool system of claim 15, wherein each corner edge portion and the adjacent wiper edge and the adjacent cutting edge form a cutting region, and wherein the cutting insert comprises four left handed cutting regions and four right handed cutting regions.

17. The cutting tool system of claim 15, the cutting insert further comprising a mounting through hole extending through the first pair of opposing side surfaces, the center of the mounting through hole defining a central longitudinal axis, wherein the central longitudinal axis of the cutting insert forms a mounting angle with the central longitudinal rotational axis of the tool holder when the cutting insert is mounted in the at least one pocket.

18. The cutting tool system of claim 17, wherein the mounting angle is from 0.1 to 5 degrees.

19. The cutting tool system of claim 15, wherein the first sidewall portion provides a positive axial clearance angle from a horizontal plane normal to the central longitudinal rotational axis of the tool holder of from 0.5 to 15 degrees.

20. An indexable cutting insert, comprising:
a first face, a second face opposite the first face, a first pair of opposing side surfaces, a second pair of opposing side surfaces and a corner radius connecting each of the first pair of opposing side surfaces to each of the second pair of opposing side surfaces;
a mounting through hole extending through the first pair of opposing side surfaces, the center of the mounting through hole defining a central longitudinal axis;
a first wiper edge and a second wiper edge formed at an intersection between each of the first and second faces and each of the first pair of opposing side surfaces, wherein the first and second wiper edges comprise convex portions extending away from the central longitudinal axis;
a first cutting edge and a second cutting edge formed at an intersection between each of the first and second faces and each of the second pair of opposing side surfaces;
a corner edge portion formed at an intersection between each of the first and second faces and each corner radius;
a second axis perpendicular to the central longitudinal axis and parallel to the first and second pairs of opposing side surfaces, wherein
the first cutting edge and the second cutting edge are mirror symmetric about a plane that is parallel to the central longitudinal axis and parallel to the second axis.

* * * * *